United States Patent [19]

Moser

[11] 3,810,128

[45] May 7, 1974

[54] SEMICONDUCTOR SWITCHING AND STORAGE DEVICE

[75] Inventor: Andreas Moser, Thalwil, Switzerland

[73] Assignee: International Business Machines Corporation, Armonk, N.Y.

[22] Filed: Sept. 26, 1972

[21] Appl. No.: 292,475

[30] Foreign Application Priority Data

Sept. 30, 1971 Switzerland ........................ 14201/71

[52] U.S. Cl. ............. 340/173 R, 307/238, 307/279, 307/317

[51] Int. Cl. ............................................. G11c 11/40

[58] Field of Search ......... 340/173 R; 307/238, 279, 307/317, 318

[56] References Cited

OTHER PUBLICATIONS $Nb_2$ 05 Memory Cell, W. Anacker et al., IBM Tech. Disc. Bull. Vol. 13, No. 5, Oct. 1970, pp. 1189–1190.

*Primary Examiner*—Terrell W. Fears

*Attorney, Agent, or Firm*—John A. Jordan

[57] ABSTRACT

A Schottky barrier non-volatile bistable switch and memory device, such as a rhodium contact on gallium arsenide. In one embodiment, a field effect transistor with bistable Schottky contact is made. The latter is employed in storage cell arrangement.

15 Claims, 9 Drawing Figures

SEMICONDUCTOR SWITCHING AND STORAGE DEVICE

CROSS-REFERENCE TO RELATED APPLICATIONS

Reference is made to the following applications, assigned to the assignee of the present invention:

U.S. Application, Ser. No. 46,943, entitled "Heterojunction Switching and Memory Device," by Harold Hovel, filed June 17, 1970.

U.S. Application, Ser. No. 260,861, entitled "GaN Switching and Memory Devices and Methods Therefor," by J.J. Cuomo et al., filed Dec. 30, 1971.

BACKGROUND OF THE INVENTION

1. Field of the Invention

The present invention relates to semiconductor switching and storage devices, and more particularly, to bistable switching and storage devices using a Schottky contact.

2. Description of the Prior Art

Electric switching between a high impedance state and a low impedance state has been observed in thin layers of various materials. Some of these are $Nb_2O_5$, NiO, chalcogenide glasses, GaAs, $TiO_2$, transition metal doped glasses and a variety of other insulators. For all except $VO_2$, these layers, as prepared, are in a low conductivity state and require a breakthrough, i.e., a forming process, to develop the high conductivity state. For NiO, metallic bridges between the electrodes have been observed. For chalcogenide glasses which exhibit memory, a phase change in the material has been suggested to cause the state of high conductivity. Switching in transition metal doped phosphate glasses has been attributed to electronic effects which are due to the presence of mixed valency ions such as $Cu^{I}$ or $Cu^{II}$. Switching in $VO_2$ films is thermal and related to the well-known metal insulator transition which occurs at 68° C.

Thus, bistable switching in amorphous materials and thin films is due to a variety of causes, both thermal and electronic. Reference is made to T.W. Hickmot and W.R. Hyatt, "Solid State Electronics," Pergamon Press, 1970, Vol. 13, pp. 1033–47. Switching and memory action in semiconductor devices have been reported for compensated and uncompensated germanium at a temperature of 20° Kelvin in *Proceedings of the IRE*, 1959, Vol. 47, pp. 1207–13. Finally, in *Applied Physics Letters*, 1970, Vol. 17, No. 4, pp. 141–3, a bistable semiconductor device was described having a heterojunction of ZnSe-Ge, ZnSe-GaAs, GaP-Ge or GaP-Si and working at room temperature. Also, in the latter article, general reference was made to the possibility of obtaining the bistable switching and memory characteristics described therein by utilization of a Schottky barrier. However, no particular Schottky barrier was suggested or described, and the exact manner by which the described switching and memory characteristics would be achieved by a Schottky barrier arrangement was not pursued.

The above mentioned devices have in common the possible advantage of simplicity and the possibility of high packing density for data storages in electronic data processing equipment. A disadvantage of these devices, however, resides in their incompatibility with available semiconductor technology concerning their electric characteristics as well as their manufacturing methods. This is true particularly for integration of these devices together with semiconductor logic circuits. The present invention aims at overcoming these disadvantages.

SUMMARY OF THE INVENTION

It is, therefore, an object of the present invention to provide an improved non-volatile bistable storage element, which element maintains its state over a long period of time.

It is another object of the present invention to provide a bistable storage element which allows high packing density without excessive heat-up due to consumption of electric energy.

It is a further object of the present invention to provide a fast switching storage cell of high reliability.

It is yet a further object of the present invention to provide a storage cell fully compatible with today's semiconductor technology and readily integrable into semiconductor devices.

These objects are achieved by a semiconductor switching device comprising a Schottky barrier, being independent of external energy supply and having two stable impedance states. The Schottky barrier which is constituted of a metal electrode on semiconductor material has a high density of deep energy traps within and near the depletion region created by that contact. The Schottky barrier may be embodied in a field effect transistor arrangement for use in a storage cell, and the like.

The foregoing and other objects, features and advantages of the invention will be apparent from the following more particular description of the preferred embodiments of the invention as illustrated in the accompanying drawings.

DETAILED DESCRIPTION OF THE PREFERRED EMBODIMENTS

Figure 1:
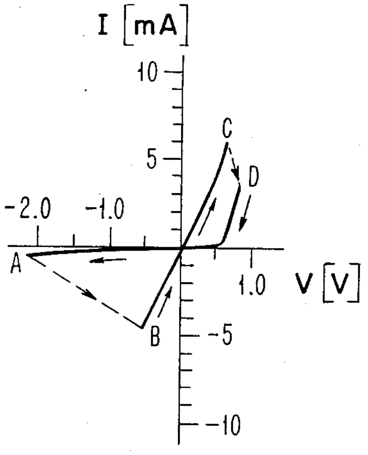
FIG. 1 shows the voltage-current characteristics of the bistable Schottky contact, in accordance with the present invention.

FIG. 1 shows the I-V characteristics of a Schottky diode exhibiting memory, according to the present invention. The indicated values concern an element constituted by a rhodium contact on gallium arsenide. Line A–D represents the normal characteristics of a diode having a natural contact voltage of about +0.6V. As can be recognized, the resistivity of the diode is rather low for high voltages, whereas a high resistivity exists if voltages are low or negative. If a negative voltage is applied and increased up to point A and further, a switch-over occurs. Thereupon, the voltage decreases rapidly and a relatively high negative current flows as is indicated by point B in FIG. 1. A conventional diode would now normally be destroyed, its characteristic corresponding to line B–C, and rectifier action would no longer be available. With the present diode, however, the original characteristic can be restituted by applying a positive current up to point C or beyond. The element will then switch to point D and after this action its performance will be the original one as indicated by line A–D.

Figure 9:
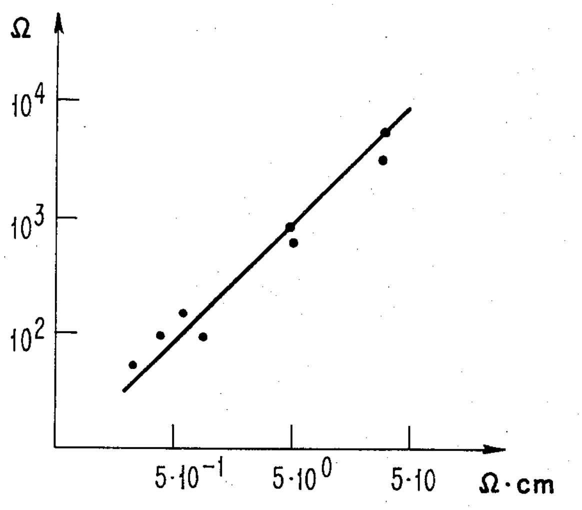
FIG. 9 shows a graphic plot of the resistance of the Schottky diode in the high conduction state versus the specific resistance of the conductive semiconductor layer.

The value of the current at point B, FIG. 1, depends upon the load characteristic of the switch-over circuit. A typical value of threshold point C for gallium arsenide diodes is in the order of 6 mA but, depending upon the dimensions of the element, may be lower. The high conductive state is almost ohmic and in the order of 50–500 Ohms. The resistance value for a particular element depends upon the conductivity of the semiconductor material beneath the Schottky contact, i.e., the dotation of this material. FIG. 9 shows the relation of these values. The absissa in FIG. 9 indicates the specific resistance of epitactic layers used in several samples. The ordinate shows the resistance of the respective samples in the high conductive state.

A typical voltage value at the threshold from low conductivity to high conductivity, for gallium arsenide diodes, is between 0.5V and 5V. The state of low conductivity, as already mentioned, is equal to the normal diode characteristic with a resistance below contact voltage of more than $10^5$ Ohms. After formation, i.e., after the first breakthrough, the diode resistance may be somewhat lower, due to leakage currents. The bistable storage element, accordingly, may be described as an element switching from Schottky diode to an ohmic resistance and back to a Schottky diode.

Under positive voltage, the diode state D is stable, a switchover from that state is not possible and its memory therefore is infinite. This is also true for a negatively biased state A, at voltages below the threshold point. After switching to point B, the element remains in its high conductive state, even when it carries direct or alternating currents. The high conductive state will be left only if a positive current is applied sufficient to surpass the threshold point at C.

The physical phenomena involved in the bistable switching and memory characteristics of the Schottky diodes, in accordance with the present invention, is obviously electronic in nature and based upon the existence of deep energy traps. If the negative voltage at the metal-semiconductor interface is increased until or near breakthrough, free carriers in the electric field of the depletion zone acquire sufficient energy to ionize deep energy trap impurities upon collision. At a critical electric field strength, this ionization surpasses the recombination rate and a reversible, non-destructive, breakthrough occurs. At the end of the process essentially all impurities are ionized and the conductivity has changed up to four orders of magnitude. The region in which the conductivity has changed is strictly limited to that in which the electric field surpasses a critical magnitude. Therefore, a localized conductivity modulation or even a conductivity path can be assumed. Finally, under the influence of a positive voltage in the low conductive state, electrons are injected into the semiconductor-metal interface. Since the current passes a narrow path, electron density in the vicinity of the positively ionized traps becomes so high that even if the density of empty traps in the region is high, the traps are filled up rapidly. If the injected electron density is sufficient, the path of low resistance through the interface will disappear and the high resistance state is assumed. These mechanisms and phenomena are similar to the ones described in the co-pending patent application, Ser. No. 46,943, cross-referenced above.

Compensated gallium arsenide contains numerous traps. Any Schottky diode built on that material therefore presents the described properties. Refer, e.g., B.V. Kormilov et al., Soviet *Physics — Semiconductor*, 1971, Vol. 5, No. 15, p. 119. Typically, an epitactic n-conductive layer may be grown on a low conductive substrate. The layer is sufficiently doped to accept a Schottky electrode. A formation process is carried out thereafter by briefly applying a negative voltage producing breakthrough. This renders the element bistable.

The breakthrough field for most diodes fabricated in accordance with the present invention is in the order of $10^6$V/cm. After this first breakthrough, switching occurs as described in connection with FIG. 1. The element switches from the high conductivity state at current threshold C through the low conductivity state D and back from the voltage threshold A into high conductivity state B. It appears that the manufacturing process for bistable gallium arsenide diodes is generally conventional except for the forming step which results in a first breakthrough of the diode. This property resides in the fact that gallium arsenide contains a large number of deep energy traps which, of course, is not the case for all semiconductor materials.

In general, silicon semiconductor material is usually basically free of traps. Conventional Schottky diodes on silicon therefore are not bistable and a breakthrough of negative voltage, which would render a gallium arsenide diode bistable, would be final in a silicon diode. Bistability can be provoked by introduction of deep energy traps into the silicon. Accordingly, it is possible to make bistable silicon Schottky diodes, similarly to those of gallium arsenide.

The silicon bistable Schottky diode, in accordance with the present invention, can either be made of highly conductive material, or alternatively, can be made with a doped channel layer of sufficient thickness. Before making the diode, the silicon is doped with a deep energy trap impurity, such as platinum, nickel, gold, or any other material creating sufficient traps in the silicon. Iron, manganese, mercury, chromium, silver, copper, zinc, cobalt are substances suitable for the purpose. It is necessary to diffuse at the beginning because diffusion takes place at 1,000° C, whereas the manufacture of Schottky diodes only requires 550° C.

Schottky diodes, according to the present invention, may be made on silicon, for example, according to one of the processes described in connection with Schottky transistors in *IBM Journal of Research and Development*, Vol. 14, No. 2, March 1970. For example, the respective surface portions may be metallized with palladium in a first masking step. Gold doped with antimony applied to the one contact, spreads out and converts the entire contact area into an ohmic contact. Spreading and alloying occurs at 550° C. The process is self-registering and allows diodes of particularly narrow contact distance to be made. Breakthrough fields of above $10^6$V/cm are obtained at relatively low voltages. Contact distance may be in the order of 1 μm. The formation voltage required is of the order of 20 V. Threshold voltages and currents are slightly larger than those of gallium arsenide diodes.

It is obvious that any conceivable contact configuration and many metal compositions are possible for making Schottky contacts and ohmic contacts on silicon, in order to fabricate the bistable diodes of the present invention, as long as the silicon is doped with a sufficient trap density. Other semiconductor materials, e.g., germanium, are also possible. Since the conductivity modulation within the semiconductor material appears to be restricted, storage devices of extremely small dimensions are possible. The property of the device of being non-volatile, i.e., to consume no stand-by power at all, and the fact that the energy amount required for switching is in the order of 10 picojoules only, makes storage arrays of extremely high packing density a real possibility.

If the geometry of the device is chosen so that the highest electric field strength appears in a well limited area, and if a well limited trap impurity profile is applied, as is possible with processes such as ion implantation, devices can be made that need no forming step at all.

Figure 2:
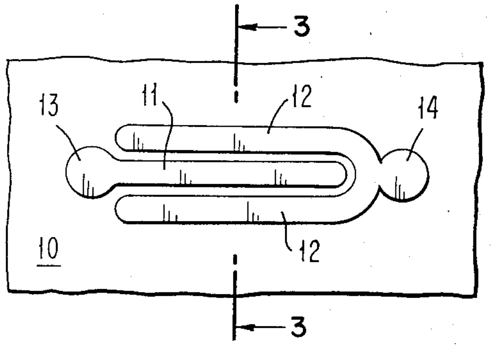
FIG. 2 shows a top view of an embodiment of the Schottky diode arrangement, in accordance with the present invention.
Figure 3:
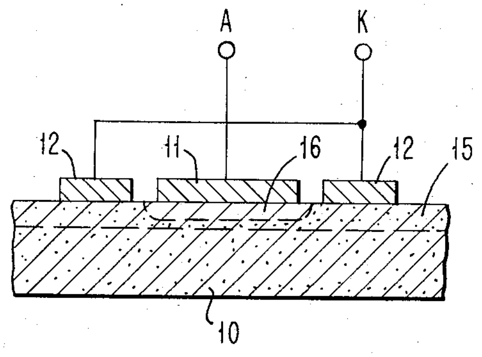
FIG. 3 shows a cross-section of the diode according to FIG. 2.

The planar view and cross section of FIGS. 2 and 3, respectively, show one possible embodiment of the subject bistable diode. Both drawings use identical reference numerals. Semiconductor substrate 10, which may be part of a large monolithic integrated array, supports electrode metallization 11 as anode, comprising a Schottky contact as previously described. The free end of the anode leads to metallized contact land area 13, which serves for connection of an electric lead wire. Instead of land area 13, the metallization, as indicated by 11, can continue to another part of the integraed circuit, not shown in the drawing. Anode 11 is essentially surrounded by cathode 12 constituted by an ohmic contact. Both parts 12 of the cathode are interconnected in the connection land area 14. The semiconductor chip 10, i.e., the substrate, essentially comprises a non-conductive semiconductor material such as silicon, gallium arsenide, etc. The substrate carries a thin highly conductive channel layer 15. Cathode contact 12, which is shown in two parts in FIG. 3, and Schottky contact 11, which constitutes the anode, are arranged on top of the channel layer. Underneath the Schottky contact 11, a depletion zone 16 is created within channel layer 15 by depletion of charge carriers. This occurs as a consequence of the natural contact voltage appearing at the interface between anode metallization 11 and the semiconductor material of the channel layer 15. Further details of this type of diode arrangement are not described here since they are already well known to those skilled in the art.

Figure 8:
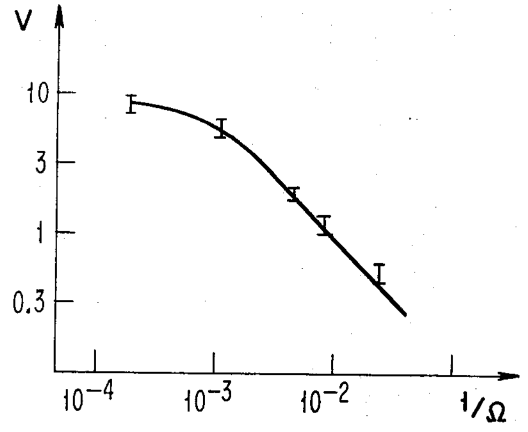
FIG. 8 shows a graphic plot of the switching voltage of the Schottky diode versus the conductivity in high conduction state, in accordance with the present invention.

FIG. 8 shows a graphic plot of the relation between the threshold voltage at point A of FIG. 1 in an individual bistable diode element and the conductivity exhibited by the same element in its high conductive state. It is apparent that elements needing more threshold voltage exhibit less conductivity in their ohmic state than elements needing less threshold voltage. This suggests that the switching process within the element is purely electronic, rather than thermal or mechanical in nature.

As already mentioned above, the storage state of the bistable diode may be sensed over and over, in repetition. The reading impulse must be sufficiently small so as to not switch the diode. This may be a disadvantage for certain applications, e.g., when it is desired to use the reading signal of a storage cell directly for writing into another similar storage cell.

However, the latter disadvantage can be overcome because the Schottky contact in which resides the basis of the bistable behaviour of the element, not only can constitute the anode of a diode, but also the gate of a field effect transistor. To read out the storage state, the gate of the transistor is connected to a source of positive bias across a suitable resistor. If the gate is in its low conductance state, a small gate current will flow, which current creates a small voltage drop across the resistor. Accordingly, the gate carries a high positive voltage. If, on the other hand, the gate is in its high conductive state, a high gate current will flow, creating a high voltage drop across the resistance. The gate now has a small positive voltage. The voltage state of the gate is translated into the current magnitude carried by the transistor determined by source-drain impedance when a positive signal is applied to the drain. The drain current has no influence upon the switching state of the gate, and therefore may be as high as the design of the transistor allows according to conventional dimensioning. The drain current in such a circuit can only assume two distinct values dependent upon the storage state of the Schottky gate, provided the load in the drain circuit is constant.

Figure 6:
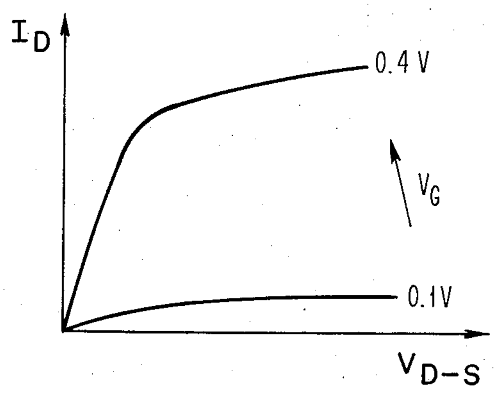
FIG. 6 shows graphic characteristics of the transistor arrangement according to FIGS. 4 and 5.
Figure 7:
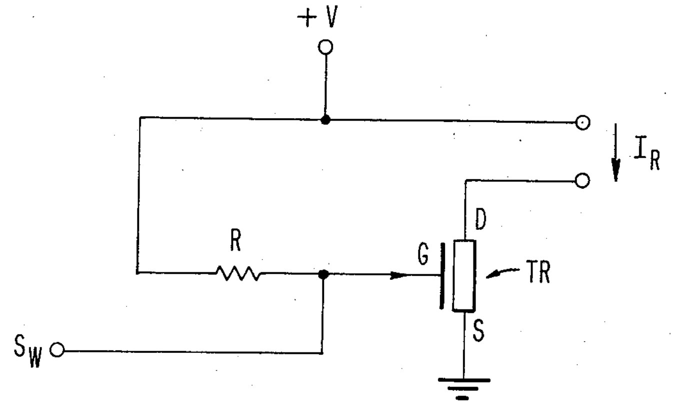
FIG. 7 shows a circuit diagram of a Schottky barrier field effect transistor storage cell, in accordance with the present invention.

FIG. 7 shows a simple version of one possible embodiment of a storage cell, using the immediately above described field effect transistor arrangement. The field effect transistor TR, which will be described in more detail with regard to FIGS. 4, 5, and 6, has a source electrode S which is connected to ground and simultaneously the negative supply voltage source. A positive signal may be applied to drain D, which in the drawing is connected to an output terminal. It is clear that any convenient pulsing or switching arrangement may be used to apply a positive signal to drain D. The flow of a current IR indicates the storage state of the cell. The other terminal of the output is connected to the positive voltage source +V. Gate electrode G, constituted by a Schottky contact, is connected to input terminal Sw from which, by application of an appropriate signal, the impedance state of the gate can be influenced. Furthermore, the gate is connected across a resistance R to the positive voltage source +V.

As is clear, a negative signal of sufficient magnitude at terminal S*w* causes the gate contact to become low-ohmic, which, in turn will cause a current to flow across resistance R and, accordingly, the gate voltage to become low. In consequence, no current IR will flow across the output terminals. On the other hand, a positive signal at terminal Sw will render the gate contact high-ohmic and thereby interrupt any current flow across resistance R. Accordingly, the gate voltage will raise in this latter instance, and a current IR will flow across the output terminals.

FIG. 6 shows the characteristics of a field effect transistor, the Schottky gate of which is constituted by the bistable diode element, in accordance with the present invention. The drain current is plotted in dependence upon the voltage between source and drain, and the gate voltage as third parameter. The characteristics should require no further explanation.

Figure 4:
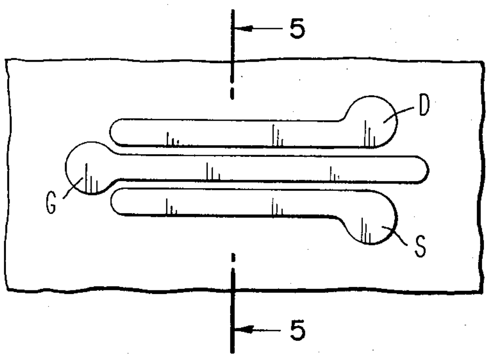
FIG. 4 shows, in top view, an embodiment of a field effect transistor with Schottky gate contact, in accordance with the present invention.
Figure 5:
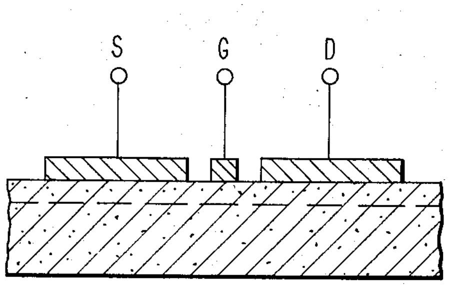
FIG. 5 shows a cross-section of the transistor arrangement according to FIG. 4.

FIG. 4 is a top view and FIG. 5 a cross-section thereof of a field effect transistor arrangement with bistable Schottky contact gate, in accordance with the present invention. The design is similar to that of the diode described in connection with FIGS. 2 and 3 above and should also require no further detailed explanation. What was said in connection with the bistable diode element of FIGS. 2 and 3 is true with respect to the source and gate of the field effect transistor arrangement of FIGS. 4 and 5. The switching energy of the bistable transistor, therefore, is identical to that of the diode. Signals on gate and drain may be removed without the storage state of the gate contact being lost. Alternatively, signals may be applied permanently if the heat dissipation capability of the element so allows.

With regard to both the respective diode and transistor of FIGS. 3 and 5, the ohmic contacts 12, and S and D, respectively, do not necessarily have to be on the surface of the device as shown in FIGS. 2–5. Electrodes constituted by these contacts may also be designed in the form of N+—doped zones arranged beneath *n* conductive layer 15. Such an arrangement will give rise to the possibility of arranging these zones, or parts thereof, on the back or bottom side, respectively, of chip 10 either through openings or diffusion through the back. In this way, particularly simple storage matrixes may be built because, for example, X lines can be arranged on the front and Y lines on the back of the semiconductor chip. Production of the required diffusion from the back or of so-called "buried layers" is know in the art, and needs no further explanation.

It is obvious that those skilled in the art will recognize further embodiments, particularly the possibility of using other materials than those mentioned, and according to the desired performance and use, other geometric arrangements for discrete elements or for elements within monolithic integrated circuits, without departing from the spirit of the invention.

What is claimed is:

1. A non-volatile bistable switch and memory cell comprising a field-effect transistor arrangement including a semiconductor substrate having at least first and second electrodes forming ohmic contacts therewith and at least one Schottky contact disposed between said at least first and second electrodes and forming a Schottky barrier therewith, said semiconductor substrate including semiconductor material at least within the depletion region created by said Schottky contact exhibiting a sufficient density of deep energy traps so that the interaction between the charge carriers of said semiconductor material and said traps may assume either of two stable impedance states to thereby provide non-volatile bistable impedance characteristics between said Schottky contact and at least one of said at least first and second electrodes.

2. The device as set forth in claim 1 wherein said metal is rhodium and said semiconductor material is gallium arsenide.

3. The bistable switch and memory cell as set forth in claim 1 wherein said field-effect transistor arrangement forms a memory cell including potential means coupled to said Schottky contact and to said at least first and second electrodes, said potential means coupled to said Schottky contact by impedance means so that the potential applied to said Schottky contact changes in dependence upon which of said either of two stable impedance states exist between said Schottky contact and one of the said at least first and second electrodes whereby the current path between said at least first and second electrodes varies in accordance with the said potential applied to said Schottky contact.

4. The bistable switch and memory cell as set forth in claim 3 including both means to apply pulses to said Schottky contact to switch said cell between said either of two stable impedance states and means to apply pulses to one of the said at least first and second electrodes such that the resultant level of current flow between said at least first and second electrodes is indicative of one or the other of the said two stable impedance states existing in said memory cell.

5. The device as set forth in claim 1 wherein said semiconductor material comprises silicon doped with a substance which creates deep energy traps.

6. The device as set forth in claim 5 wherein said silicon is doped with at least one substance of the group platinum, nickel, gold, iron, manganese, mercury, chromium, silver, copper, zinc, and cobalt.

7. The device as set forth in claim 4 wherein said metal is rhodium and said semiconductor material is gallium arsenide.

8. A field effect transistor including a source and drain electrode, the improvement comprising a gate electrode forming a Schottky barrier with the semiconductor substrate region thereof, said semiconductor substrate region including semiconductor material at least within reach of said Schottky barrier exhibiting a sufficient density of deep energy traps such that the interaction between the charge carriers thereof and said traps may assume either of two stable states to thereby provide non-volatile bistable impedance characteristics between said gate electrode and one of said source and drain electrodes.

9. A storage cell, comprising bistable field effect transistor means including a source, drain and gate electrode with said gate electrode arranged to form a Schottky contact with the semiconductor substrate of said transistor means, said semiconductor substrate exhibiting at least within the semiconductor region thereof which may be affected by potentials applied to said gate electrode, a sufficient density of deep energy traps such that the interaction between the charge carriers thereof and said traps may assume either of two stable states so as to thereby provide a non-volatile bistable impedance characteristic between said gate electrode and one of said source and drain electrodes.

10. The storage cell as set forth in claim 9 including control means coupled to said gate electrode so that when the impedance between said gate electrode and said one of said source and drain electrodes is switched to one stable state thereof a first potential is applied to said gate electrode to provide a first impedance between said source and drain electrodes and when the impedance between said gate electrode and the said one of said source and drain electrodes is switched to the second stable state thereof a second potential is applied to said gate electrode to provide a second impedance between said source and drain electrode.

11. The storage cell as set forth in claim 10 wherein said control means includes both resistance means coupled between a source of potential and said gate electrode and pulse source means coupled to said gate electrode to control the impedance state thereof.

12. The storage cell as set forth in claim 9 wherein said gate electrode is rhodium and said semiconductor substrate is gallium arsenide.

13. The storage cell as set forth in claim 9 wherein said semiconductor substrate comprises silicon doped at least within the said semiconductor region which may be affected by potentials applied to said gate electrode, with a substance which creates said deep energy traps.

14. The storage cell as set forth in claim 13 wherein said silicon is doped at least within said region with at least one substance of the group platinum, nickel, gold, iron, manganese, mercury, chromium, silver, copper, zinc, and cobalt.

15. The storage cell as set forth in claim 11 wherein said semiconductor substrate comprises silicon doped at least within the said semiconductor region which may be affected by potentials applied to said gate electrode, with at least one substance of the group platinum, nickel, gold, iron, manganese, mercury, chromium, silver, copper, zinc, and cobalt.

* * * * *